US009610565B2

(12) United States Patent
Ghose et al.

(10) Patent No.: US 9,610,565 B2
(45) Date of Patent: Apr. 4, 2017

(54) CATALYSTS FOR OXIDATIVE COUPLING OF METHANE AND SOLUTION COMBUSTION METHOD FOR THE PRODUCTION OF THE SAME (71) Applicant: PURDUE RESEARCH FOUNDATION, West Lafayette, IN (US)

(72) Inventors: Ranjita Ghose, West Lafayette, IN (US); Hyun Tae Hwang, West Lafayette, IN (US); Arvind Varma, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 13/971,357

(22) Filed: Aug. 20, 2013

(65) Prior Publication Data
US 2014/0080699 A1  Mar. 20, 2014

Related U.S. Application Data (60) Provisional application No. 61/684,942, filed on Aug. 20, 2012.

(51) Int. Cl.
*B01J 23/34* (2006.01)
*C01F 17/00* (2006.01)
*C01F 11/04* (2006.01)
*B01J 37/08* (2006.01)
*B01J 23/00* (2006.01)
*B01J 23/02* (2006.01)
*B01J 23/10* (2006.01)
*B01J 35/00* (2006.01)
*C01F 7/16* (2006.01)
*C01G 41/02* (2006.01)
*B01J 23/85* (2006.01)
*B01J 23/28* (2006.01)
*B01J 37/04* (2006.01)

(52) U.S. Cl.
CPC ............ *B01J 23/34* (2013.01); *B01J 23/005* (2013.01); *B01J 23/02* (2013.01); *B01J 23/10* (2013.01); *B01J 35/002* (2013.01); *B01J 37/088* (2013.01); *C01F 7/166* (2013.01); *C01F 11/04* (2013.01); *C01F 17/0025* (2013.01); *C01F 17/0043* (2013.01); *B01J 23/28* (2013.01); *B01J 23/85* (2013.01); *B01J 37/04* (2013.01); *B01J 2523/00* (2013.01); *C01G 41/02* (2013.01); *C01P 2002/72* (2013.01)

(58) Field of Classification Search
CPC ... B01J 23/32; B01J 23/28; B01J 23/85; B01J 23/02; C01G 41/02; C01F 7/166
USPC ............ 502/241, 254, 303, 341; 423/594.16, 423/594.13, 594.15, 600, 263
See application file for complete search history.

(56) References Cited

U.S. PATENT DOCUMENTS 3,330,697 A   7/1967   Pechini

OTHER PUBLICATIONS

Kumar et al., Synthesis of lanthanum aluminate by a citrate-combustion route, 1995, Materials Letters, 25, 171-174.*
Tagawa et al., Activity and selectivity of oxidative coupling of methane over LaAlO3 catalyst, 1988, React. Kinet. Catal. Lett., 37, 115-120.*
Chemical Book, Lanthanum(III) nitrate hexahydrate, 2014, Chemical Book, http://www.chemicalbook.com/ChemicalProductProperty_EN_CB1278729.htm.*
Sundaram, et al., "Ethylene", *Kirk-Othmer Encyclopedia of Chemical Technology*, John Wiley & Sons, Inc.
Kondratenko, et al., "Oxidative Coupling of Methane", p. 3010-3023.
Lunsford, "The Catalytic Oxidative Coupling of Methane", *Angew. Chem, Int. Ed, Engl.* 1995 34, 970-980.
Keller, et al., "Synthesis of Ethylene via Oxidative Coupling of Methane", *Journal of Catalysis* 73, 9-19(1982).
Wang, et al., "Oxidative Coupling of Methane over Oxide-Supported Sodium-Manganese Catalysts", *Journal of Catalysis* 155, 390-402 (1995).
Palermo, et al., "Critical Influence of the Amorphous Silica-to-Cristobalite Phase Transition on the Performance of Mn/Na2Wo4/SiO2 Catalysts for the Oxidative Coupling of Methane", *Journal of Catalysis* 177, 259-266 (1998), Article No. CA982109.
Arndt, et al., "Mn—Na2Wo4/SiO2 as Catalyst for the Oxidative Coupling of Methane, What is Really Known?", *Applied Catalysis A: General* 425-426 (2012) 53-61.
Kou, et al., "Amorphous Features of Working Catalysts: XAFS and XPS Characterization of Mn/Na2Wo4/SiO2 as Used for the Oxidative Coupling of Methane", *Journal of Catalysis* 173, 399-408 (1998), Article No. CA971900.
Chua, et al., "Oxidative Coupling of Methane for the Production of Ethylene Over Sodium-Tungsten-Manganese-Supported-Silica Catalyst (Na—W—Mn/SiO2)", *Applied Catalysis A: General* 343 (2008) 142-148.
Varma, et al., "Combustion Synthesis of Advanced Materials: Principles and Applications", *Advances in Chemical Engineering*, vol. 24, p. 79-226, (1998).

(Continued)

*Primary Examiner* — Matthew E Hoban
*Assistant Examiner* — James Fiorito
(74) *Attorney, Agent, or Firm* — C. John Brannon; Brannon Sowers & Cracraft PC (57) ABSTRACT

A method for making a metal oxide material and catalyzing the oxidative coupling of methane, including mixing a metal cation-containing oxidizer portion and a reducing fuel portion with water to define an aqueous solution, evaporatively removing water from the aqueous solution to yield a concentrated liquid, burning the concentrated liquid yield an homogeneous metal oxide powder, flowing methane from a first source and oxygen from a second source over the homogeneous metal oxide powder, and catalyzing an oxidative coupling of methane reaction with the homogeneous metal oxide powder. The homogeneous metal oxide powder contains metal oxides selected from the group including $LaSrAlO_4$, $LaAlO_3$, $Sr_3Al_2O_6$, $Na_2WO_4$—$Mn/SiO_2$, and combinations thereof.

6 Claims, 9 Drawing Sheets (56) References Cited

OTHER PUBLICATIONS

Varma, et al., "Combustion Synthesis of Nanoscale Oxide Powders: Mechanism, Characterization and Properties", *Mat. Res. Soc. Symp. Proc.* vol. 800. AA4.1.1-AA4.1.12, (2004).
Aruna, et al., "Combustion Synthesis and Nanomatenals", *Current Opinion in Solid State and Materials Science* 12 (2008) 44-50.
Erri, et al., "Spinel-Supported Oxygen Carriers for Inherent CO2 Separation Duringn Power Generation", *Ind. Eng. Chem. Res.* 2007, 46 8597-8601.
Erri, et al., "Novel Perovskite-Based Catalysts for Autothermal JP-8 Fuel Reforming", *Chemical Engineering Science* 61 (2006) 5328-5333.
Deshpande, et al., "High Throughput Evaluation of Perovskite-Based Anode Catalysts for Direct Methanol Fuel Cells", *Journal of Power Sources* 158 (2006) 60-68.
Deshpande, et al., "Aqueous Combustion Synthesis of Strontium-Doped Lanthanum Chromite Ceramics", *J. Am. Ceram. Soc.*, 86[7] 1149-54 (2003).
Ekambaram, "Solution Combustion Synthesis and Luminescent Properties of Perovskite Red Phosphors with Higher CRI and Greater Lumen Output", *Journal of Alloys and Compounds* 390 (2005) L7-L9.
Deshpande, et al., "Direct Synthesis of Iron Oxide Nanopowders by the Combustion Approach: Reaction Mechanism and Properties", *Chem. Mater,* 2004, 16, 4896-4904.
Russo et al., "N2O Decomposition Over Perovskite Catalysts", *Ind. Eng. Chem. Res.* 2007, 46-4226-4231.
Luo, et al., "Parallel Solution Combustion Synthesis for Combinatorial Materials Studies", *J. Comb. Chem.* 2005, 7, 942-946.
Yadav, et al., "Preparation of Highly Superacidic Sulfated Zirconia Via Combustion Synthesis and its Application in Pechmann Condensation of REsorcinol with Ethyl Acetoacetate", *Journal of Catalysis* 292 (2012) 99-110.
Ghose, et al., "Oxidative Coupling of Methane Using Catalysts Synthesized by Solution Combustion Method", *Applied Catalysis A: General* 452 (2013) 147-154.
Amenomiya, et al., "Conversion of Methane by OxidativeCoupling", *Catalysis Reviews: Science and Engineering,* 32:3, 163-227, (2008).
Amorebiata, et al., "Kinetics and Mechanism of the Catalytic Oxidation of Methane over Lithium-Promoted Magnesium Oxide", *J. Phys. Chem.* 1988, 92, 4576-4578.
Miro, et al., "Oxidative Coupling of Methane on Alkali Metal-Promoted Nickel Titanate", *Journal of Catalysis* 124, 465-476 (19901.
Feng, et al., "Kinetic Studies of the Catalysic Oxidation of Methane. 1. Methyl Radical Production on 1% Sr/La2O3", *J. Phys. Chem.* 1991, 95, 6558-6563.
Lehmann, et al., "Kinetic Studies of the Oxidative Coupling of Methane Over a NaOH/CaO Catalyst", *Journal of Catalysis* 135, 467-480 (1992).
Matin, et al. "Kinetics of Oxidative Coupling of Methane Over Na/BaTiO3/MgO Catalyst: Mechanistic Aspects", *Journal of the Japan Petroleum Institute,* 49, (1), 13-21 (2006).
Takanabe, et al., "Mechanistic Aspects and Reaction Pathways for Oxidative Coupling of Methane on Mn/Na2Wo4/SiO2 Catalysts", *J. Phys. Chem. C* (2009), 113, 10131-10145.
Choudhary, et al., "Acidity/Basicity of Rare-Earth Oxides and Their Catalytic Activity in Oxidative Coupling of Methane to C2-Hydrocarbons", *Journal of Catalysis* 130, 411-422 (1991).
Otsuka, et al., "Kinetic Studies on Partial Oxidation of Methane over Samarium Oxides", *Inorganica Chimica Acta,* 121 (1986) 237-241.
Kooh, et al., "The Influence of Various Parameters on the Oxidative Coupling of Methane Reaction Over Lithium Doped Lanthanum Oxide", *Catalysis Today,* 4 (1989) 333-344.

\* cited by examiner

CATALYSTS FOR OXIDATIVE COUPLING OF METHANE AND SOLUTION COMBUSTION METHOD FOR THE PRODUCTION OF THE SAME

CROSS-REFERENCE TO RELATED APPLICATIONS

This utility patent application claims priority to U.S. provisional patent application Ser. No. 61/684,942, filed on Aug. 20, 2012, which is incorporated hereinto by reference.

TECHNICAL FIELD

The novel technology relates generally to the materials science, and, more particularly, to a solution combustion method for the preparation of catalyst materials for the oxidative coupling of methane.

BACKGROUND

Ethylene is a precursor to many industrially important chemicals, such as polyethylene, polystyrene, polyvinyl chloride (PVC), and the like, and is primarily manufactured via high-temperature steam cracking of naphtha. The steam cracking process requires high temperatures (>900° C.) and energy for both the reaction and the product separation processes, and as such is among the largest consumers of fuel as well as the largest $CO_2$ emitter of any commodity chemical process.

Methane is the main constituent of natural gas (typically comprising more than 95 percent), for which the reserves are vast and estimated to exceed those of crude oil. Thus, there is great motivation to develop processes for converting methane into higher valued products. Currently, natural gas is primarily used for power generation, residential uses, and industrial applications, including synthetic gas production.

Thus, the oxidative coupling of methane (OCM) is an attractive alternative for the production of $C_{2+}$ hydrocarbons, as illustrated by Eq. 1:

(1)

In the OCM process, $CH_4$ is activated heterogeneously on the catalyst surface to yield methyl radicals. The methyl radicals are then able to participate in several gas phase and heterogeneous reactions yielding various products, thereby defining the reaction selectivity. Two methyl radicals may couple in the gas phase and on the catalyst surface to form ethane, which subsequently may undergo dehydrogenation to form ethylene. Carbon oxides may be formed from methane as well, as ethane and ethylene. A conversion-selectivity trend has been observed, wherein a high $CH_4/O_2$ ratio generally leads to high selectivity at low methane conversion, while a lower $CH_4/O_2$ leads to high $CH_4$ conversion with lower $C_2$ selectivity, thereby limiting $C_2$ yields. Thus, it is important to optimize the $CH_4/O_2$ ratio to achieve high $C_2$ yields.

One problem with catalyst materials has been their deactivation or degradation over time. For example, catalyst materials synthesized by traditional methods, such as by the incipient wetness impregnation method, have preferential enrichment of active components on the catalyst surface. This configuration leads to loss of catalyst efficacy with time on-stream as the surface is ablated and the exposed surface material composition changes.

Thus, there is a need for a catalyst system that is more resistive to degradation. The present novel technology addresses this need.

SUMMARY

The present novel technology relates generally to synthesis of materials, and, more particularly, to a deactivation/degradation resistant catalyst system for the oxidative coupling of methane prepared by a solution combustion synthesis technique. One object of the present novel technology is to provide an improved catalyst material. Related objects and advantages of the present novel technology will be apparent from the following description.

DETAILED DESCRIPTION OF THE PREFERRED EMBODIMENT

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

Solution combustion synthesis (SCS) is a one-step method for the preparation of nanostructured complex metal oxides having tailored physical parameters such as compositions, phases, oxidation states, surface areas, and the like. These properties are determined by control of certain variable synthesis parameters. The SCS process involves a self-sustained reaction between oxidizing agents, such as metal nitrates, and reducing agents, such as carbon chains having reactive amino, hydroxyl, carboxyl groups or the like bonded thereto. The reducing agents may be thought of as 'fuel'. In general, a predetermined amount of oxidizing agent(s) is mixed with a predetermined amount of reducing agent(s) to yield an admixture, which is typically preheated. After preheating the admixture of metal nitrates and fuel, the reaction medium forms a viscous liquid which is typically allowed to self-ignite to yield homogeneously mixed metal oxide powders. Using the SCS method, even complex multi-metal oxides, such as substituted perovskites of type $A_xA'_{1-x}B_yB'_{1-y}O_3$, may be synthesized by selecting stoichiometric proportions of metal nitrates (oxidizers) desired in the final product.

In general, the fuels can be classified based on their chemical structure (i.e. reactive amino, hydroxyl, carboxyl groups) bonded to the carbon chain. The fuel forms a complex with the metal ions and thus increases solubility. Thus, the fuel acts as both a complexing agent and provides energy required for combustion. For example, the representative reaction between metal nitrate and glycine for the formation of $La_2O_3$ is given by equation 2 below, where $\phi$ represents the fuel to oxidizer ratio and $\phi=1$ implies that all oxygen required for the reaction derives from the nitrate species.

$$2La(NO_3)_3 + 3.33\phi H_2N(CH_2)CO_2H + 7.5(\phi-1)O_2 \rightarrow La_2O_3 + \phi(6.67CO_2 + 8.33H_2O + 1.67N_2) + 3N_2 \quad (2)$$

Various simple and complex metal oxides or mixed metal oxides may be prepared using SCS, including complex metal oxide oxygen carriers, such as $(NiO)_{0.79}(MgO)_{0.21}/Ni_{0.62}Mg_{0.38}Al_2O_4$ (Mg/Ni=0.4), for chemical looping combustion. Perovskites synthesized by SCS have applications such as autothermal JP-8 fuel reforming catalysts, anode catalysts in methanol fuel cells, oxygen permeating membranes, and the like. Iron oxides synthesized by this technique have many uses, while other applications include synthesis of perovskite red phosphors, NOx decomposition catalysts, combinatorial materials synthesis, and the like. One recent application of SCS has been in the preparation of highly superacidic sulfated zirconia catalyst for Pechman condensation.

The metal cation containing precursors are typically selected from the group including lanthanum nitrate hexahydrate, strontium nitrate, aluminum nitrate nonahydrate, sodium tungstate oxide dihydrate, manganese nitrate tetrahydrate, tetraethoxysilane, and combinations thereof. The reducing fuel is typically glycine, hydrazine, oxalates, citric acid, and the like and combinations thereof. Typically, the reducing fuel portion to metal-cation containing oxidizer portion ratio is between 0.5 and 2.0. Upon ignition of a combination of reducing fuel portion and metal-cation containing oxidizer portion, gasses such as CO, $CO_2$, $H_2O$, $N_2$ and combinations thereof are evolved.

The SCS technique is believed to be especially suitable for the preparation of OCM catalysts, which are typically multimetallic and/or mixed metal oxides. One advantage of the SCS technique for OCM is that it allows easy variation of metal ratios required in the catalyst, and facilitates study of this effect on catalytic activity and selectivity. SCS has been used successfully for synthesis of several OCM catalyst series with varying metal ratios: (a) Sr—Al mixed oxides, (b) $La_2O_3$, (c) La—Sr—Al mixed oxides, and (d) $Na_2WO_4$—$Mn/SiO_2$. The $C_2$ yield and ethylene/ethane ratio were measured for each catalyst over a range of temperatures. All of the catalysts examined demonstrated good $C_2$ yields and ethylene/ethane ratios, indicating that SCS is a viable method for the preparation of OCM catalysts. It has also been demonstrated that $Na_2WO_4$—$Mn/SiO_2$ is an especially promising catalyst, as it yielded $C_2$ yield values comparable to the highest recorded in the literature.

Catalyst Synthesis

A number of catalysts compositions were prepared using the SCS technique. Briefly, metal nitrates (cation precursors) in predetermined stoichiometric amounts were mixed along with glycine (fuel) in de-ionized water. The resultant aqueous solution was then heated inside a chemical fume hood using a hot plate, resulting in evaporation of water followed by self-ignition and combustion of the remaining viscous mixture to yield voluminous powders characterized by high surface areas. A metallic mesh (140 μm) was used to cover the reaction vessel to prevent synthesized powders from escaping.

In particular, Sr—Al oxides were prepared at $\phi=1$ with varying Sr/Al ratios ranging from 0.5:1 to 2:1. Among the La-based catalysts, $La_2O_3$ was synthesized at $\phi=2$ ($\phi$ values near 1 risk an explosive reaction) and the La—Sr—Al oxides at $\phi=1$, with metal ratios appropriate for $LaSrAlO_4$ and $La_2SrAl_2O_7$ products. For preparation of $Na_2WO_4$—$Mn/SiO_2$, in a slight modification of the SCS technique, $Na_2WO_4$ and $Mn(NO_3)_2$ were used as precursors for Na, W and Mn, respectively, while $C_8H_{20}O_4Si$ was the precursor for Si, as well as being the fuel. A $\phi$ value of 2 was achieved by adding appropriate amount of $HNO_3$. All of the synthesized catalysts were calcined at 950° C. for 4 hours, then sieved into particles having diameters falling in the range 125 μm-250 μm and characterized by X-ray diffraction. Further, BET surface area, pore size and volume were measured for the samples.

Catalyst Performance Measurements

Figure 1A:
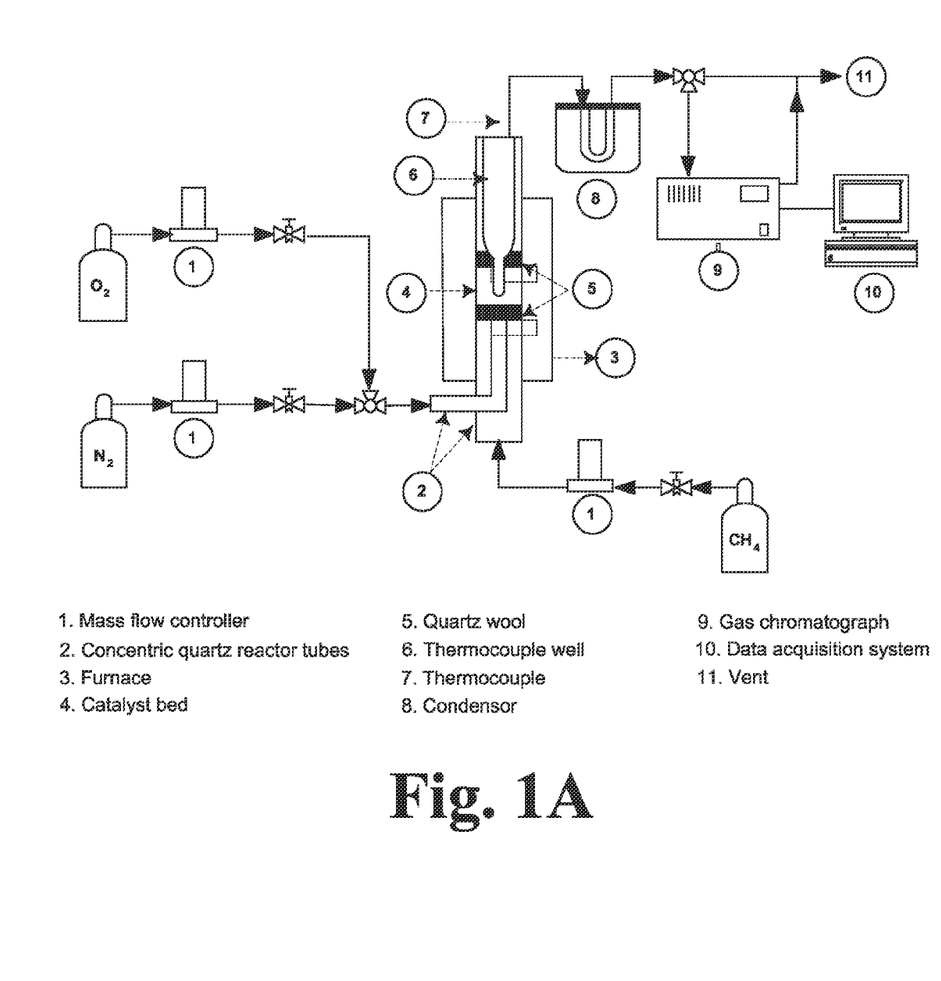
FIG. 1A is a schematic diagram of an oxidative coupling of methane reactor.
Figure 1B:
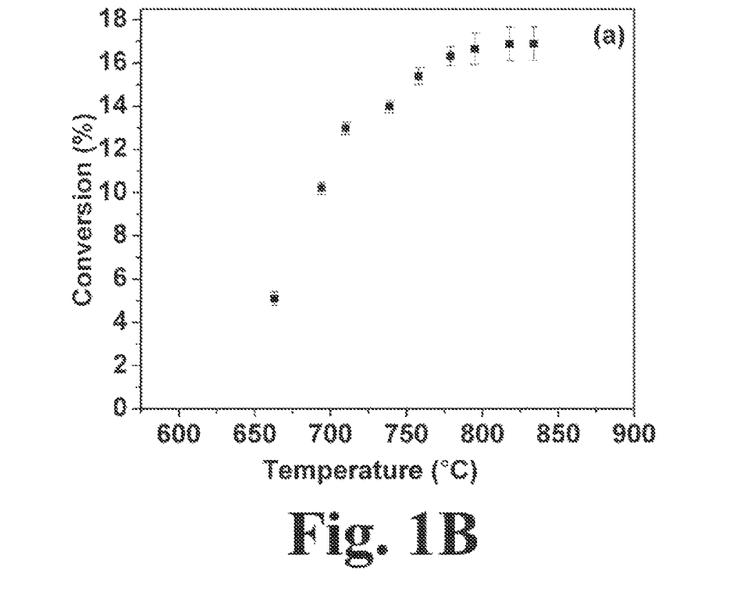
FIG. 1B is a graphic illustration of the conversion of methane as a function of temperature for the reactor of FIG. 1A.
Figure 1C:
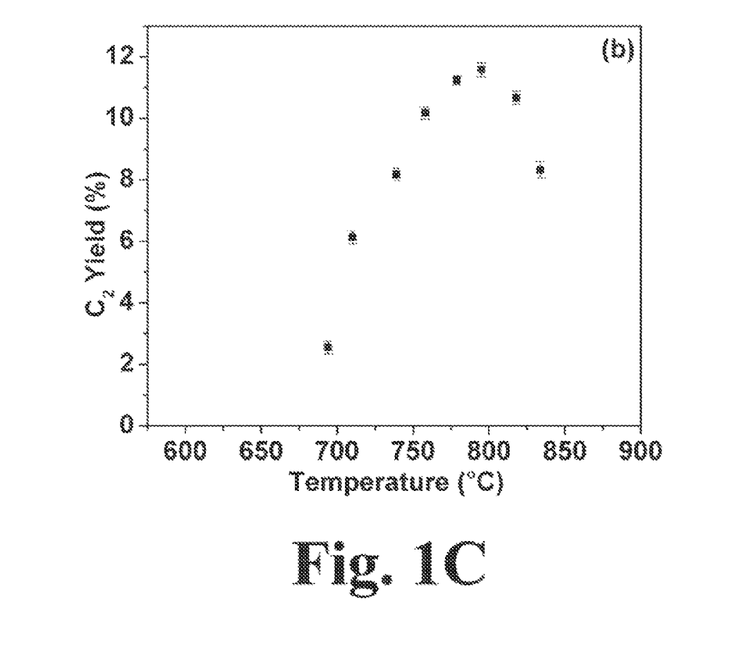
FIG. 1C is a graphical illustration of $C_2$ yield as a function of temperature for the reactor of FIG. 1A.

FIG. 1 shows a schematic diagram of the laboratory-scale production setup. The samples were produced using a fixed-bed reactor where a furnace was used to heat the catalyst bed, with a thermocouple inserted to monitor temperature. Reactant flows were controlled using mass flow controllers and the gasses exiting the reactor were analyzed using a gas chromatograph equipped with a capillary column and both thermal conductivity and flame ionization detectors. Before the gas chromatograph, a condenser was used to remove the water vapor produced during reaction. The gas line between the reactor and condenser was maintained at 150° C. to prevent water vapor condensation prior to reaching the condenser.

To decrease the homogeneous reaction of hydrocarbons and oxygen to carbon oxides (CO, $CO_2$) and $H_2O$ under the operating conditions, the heated reactor volume was decreased by two approaches. First, by flowing $CH_4$ and $O_2$ through two concentric tubes as shown in FIG. 1, the reactants were kept separate until they reached the catalyst bed. The $O_2$ flowed through the inner tube (OD=6.35 mm, ID=4 mm), while $CH_4$ through the annular space between the inner and outer (OD=12.75 mm, ID=10.5 mm) tubes. In addition, the heated reactor volume of the post-catalyst bed was decreased by using a hollow quartz cylinder which also housed a nickel-chromium based thermocouple as shown in FIG. 1. Since Ni catalyzes partial oxidation of methane to syngas, the hollow quartz cylinder also served to avoid exposure of the thermocouple to the inlet feed. The standard operating conditions were: 1 g catalyst, total flow rate 50 cc/min and feed ratio $CH_4:O_2:N_2$=32:8:10. All catalysts were tested in the temperature range 450-850° C., and the $C_2$ yield and ethylene/ethane ratio were measured. For the $Na_2WO_4$—$Mn/SiO_2$ catalyst, the effect of $CH_4/O_2$ feed ratio was also of interest.

Sr—Al Catalyst Series

Figure 2A:
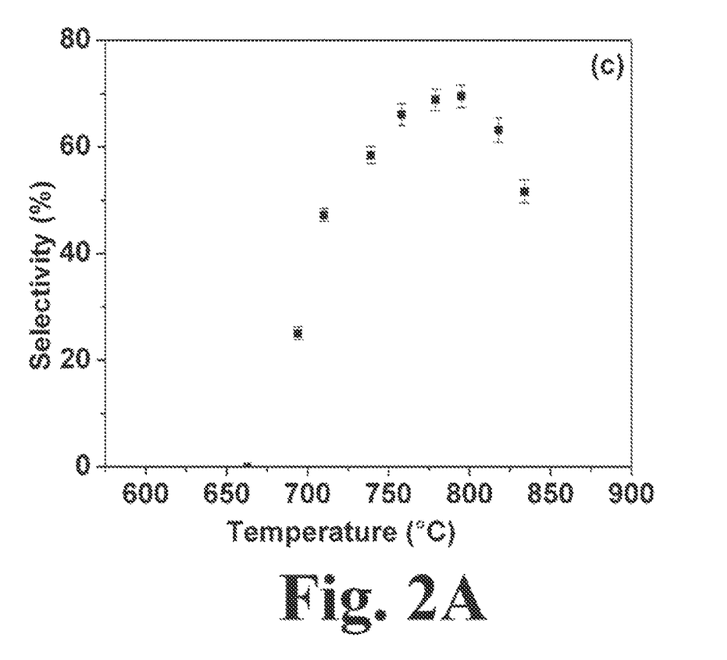
FIG. 2A is a graphical illustration of $C_2$ selectivity as a function of temperature for the reactor of FIG. 1A.
Figure 2B:
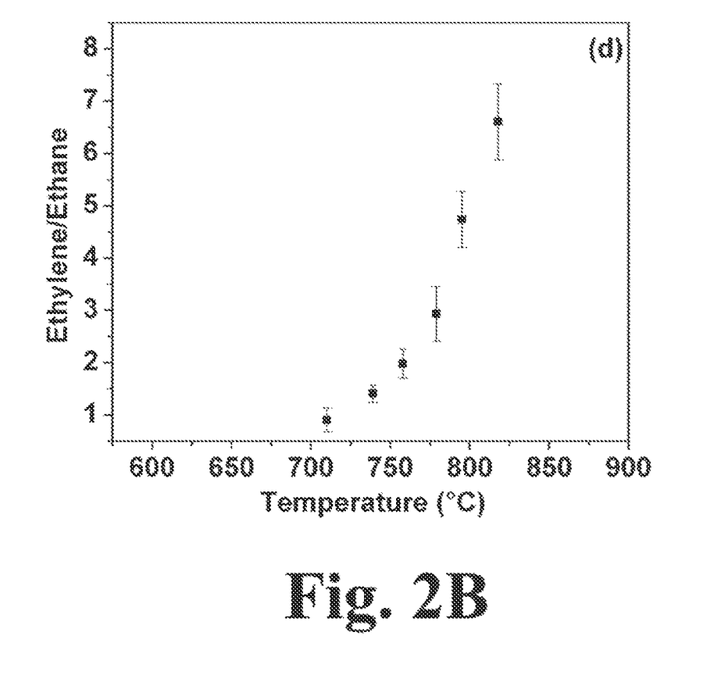
FIG. 2B is a graphical illustration of the Ethylene/Ethane ratio for the Sr—Al catalyst series, Sr/Al=1.25, as a function of temperature for the reactor of FIG. 1A.

For the OCM reaction, alkaline earth metal oxides are more active with additives such as $Al_2O_3$, $SiO_2$, and like oxides as they lower the carbonate decomposition temperature, producing active oxide sites. For example, $SrCO_3$ ordinarily decomposes at 1340° C., while addition of $Al_2O_3$ lowers the decomposition temperature. For this reason, mixed oxides of strontium and aluminum were synthesized. As noted above, the Sr—Al oxides were prepared at $\phi$=1 with varying Sr/Al ratio from 0.5 to 2 and were tested over the 450 to 850° C. temperature range. FIG. 2 shows the plots of methane conversion, $C_2$ yield, $C_2$ selectivity, and ethylene/ethane ratio as a function of temperature for Sr/Al=1.25, where the various parameters are defined as follows:

$$\text{Methane conversion (\%)} = \frac{\text{moles of methane reacted}}{\text{moles of methane in feed}} \times 100$$

$$C_2 \text{ selectivity (\%)} = \frac{2(\text{moles of ethane and ethylene formed})}{\text{moles of methane reacted}} \times 100$$

$$C_2 \text{ yield (\%)} = \text{Methane conversion (\%)} \times C_2 \text{ selectivity (\%)} \times \frac{1}{100}$$

As temperature increases, methane conversion increases before reaching a steady value obtained owing to oxygen exhaustion. The $C_2$ selectivity and yield, on the other hand, increase with temperature, reaches maxima, and then decrease as $CO_x$ formation increases at higher temperatures. The ethylene/ethane ratio also increases with increasing temperature. These trends are typical for OCM, and are exhibited by all the catalysts studied herein. Each data point is an average of 2-5 experiments, and the standard deviation is indicated by the error bars shown. Due to the complexity of plots and in the interest of brevity, however, only averages are presented in subsequent plots.

Figure 3A:
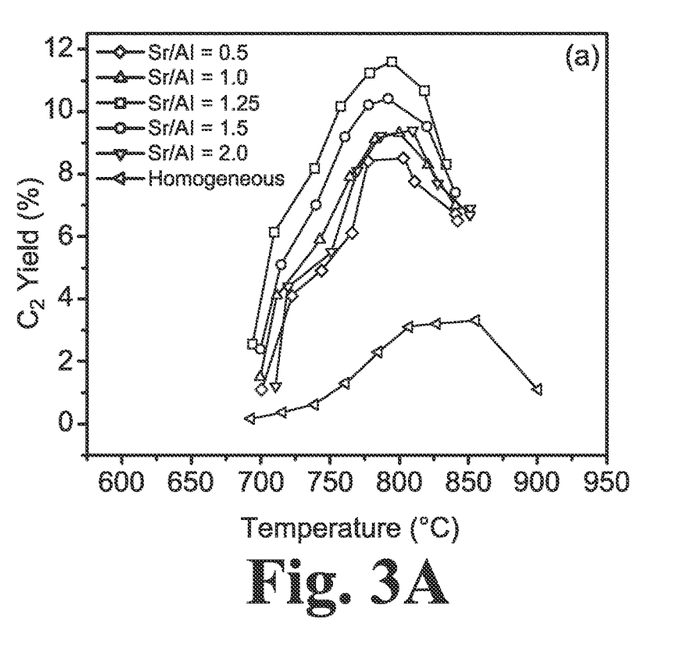
FIG. 3A is a graphical illustration of $C_2$ yield as a function of temperature for several different Sr/Al ratios for the reactor of FIG. 1A.
Figure 3B:
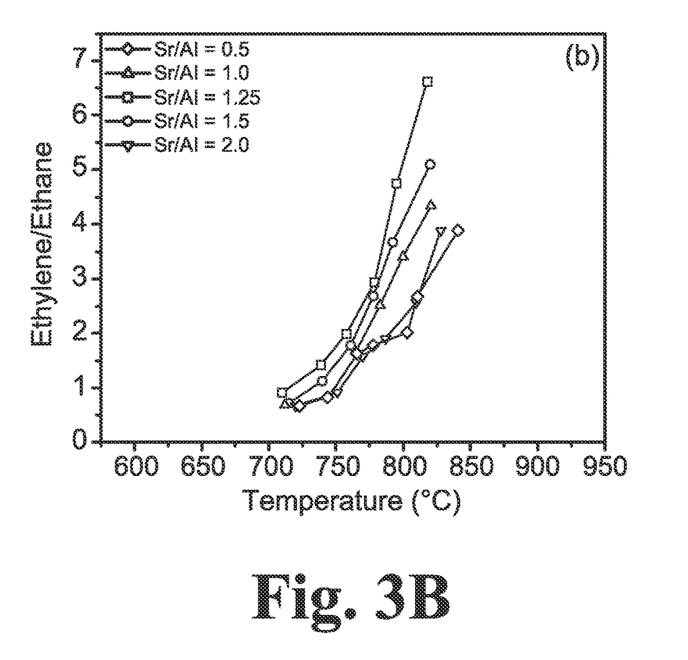
FIG. 3B is a graphical illustration of Ethylene/Ethane ratio as a function of temperature for several different Sr/Al ratios for the reactor of FIG. 1A.

FIG. 3A shows the effect of Sr/Al ratio on $C_2$ yield as a function of temperature. With increasing temperature, the $C_2$ yield first increases and then decreases as hydrocarbon oxidation rates become dominant. The ratio Sr/Al=1.25 was found to be an optimum value, with a maximum $C_2$ yield of 11.5% obtained at ~800° C. The ethylene/ethane ratio was also measured and is shown in FIG. 3B. It may be seen that this ratio increases with increasing temperature and is the highest for Sr/Al=1.25. For this case, at 800° C. where $C_2$ yield is the highest, the ethylene/ethane ratio is 4.5, which is higher than typical values less than 3 obtained for the Sr—Al catalysts prepared by conventional methods. A maximum yield of 18% has been observed at 810° C. for Sr/Al=1.25, along with ethylene/ethane ratio=1.7. FIG. 3A also shows $C_2$ yield for the gas phase reaction in the absence of catalyst. Similar to the case when catalyst is present, the $C_2$ yield increases and then decreases with reactor temperature. The maximum $C_2$ yield by gas phase homogeneous reaction was ~3.1%.

Figure 4:
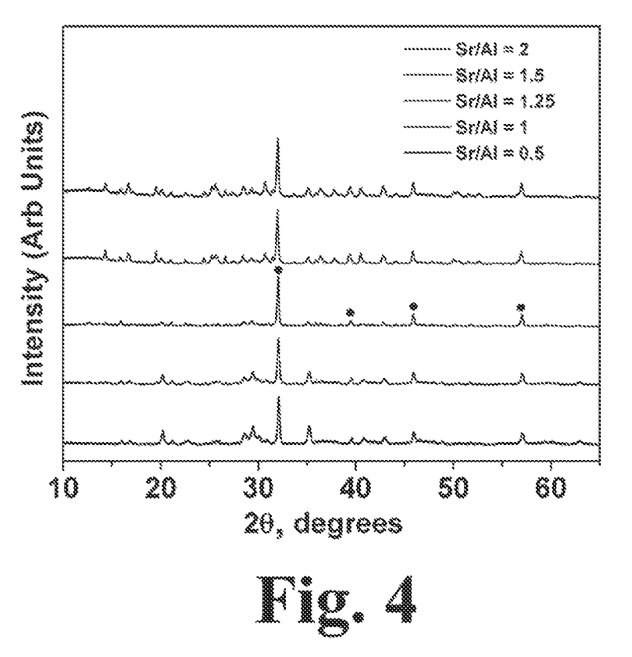
FIG. 4 graphs the XRD patterns for Sr—Al catalysts having various Sr/Al ratios.

The crystallinity of catalysts for various Sr/Al ratios was analyzed using XRD, as shown in FIG. 4. In all cases, the primary phase formed was found to be double perovskite type with the formula $Sr_3Al_2O_6$. As the Sr/Al ratio increased from 0.5 to 1.25, the relative intensity of the double perovskite peaks (indicated by the • symbol) increased, while other peaks (seen clearly for Sr/Al=0.5) decreased. The relative intensity of the double perovskite peaks was highest for Sr/Al=1.25, which also corresponds to the catalyst providing the highest $C_2$ yield. These results suggest that the double perovskite phase in the Sr—Al oxides is active for OCM.

$La_2O_3$

As discussed above, basic oxides are known to be active and selective for OCM. In particular, lanthanum oxide has been reported to be the most promising. It has been suggested that for $La_2O_3$, the acid-base pair $M^{n+}O^{2-}$ on the metal oxide surface is responsible for abstraction of H atom from $CH_4$.

Figure 5A:
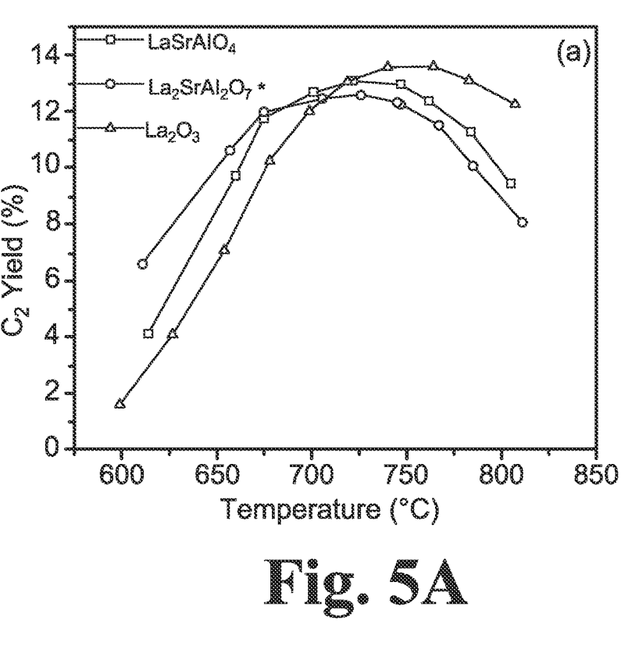
FIG. 5A is a graphical illustration of $C_2$ yield as a function of temperature for several different LA-SR—Al oxide compositions for the reactor of FIG. 1A.
Figure 5B:
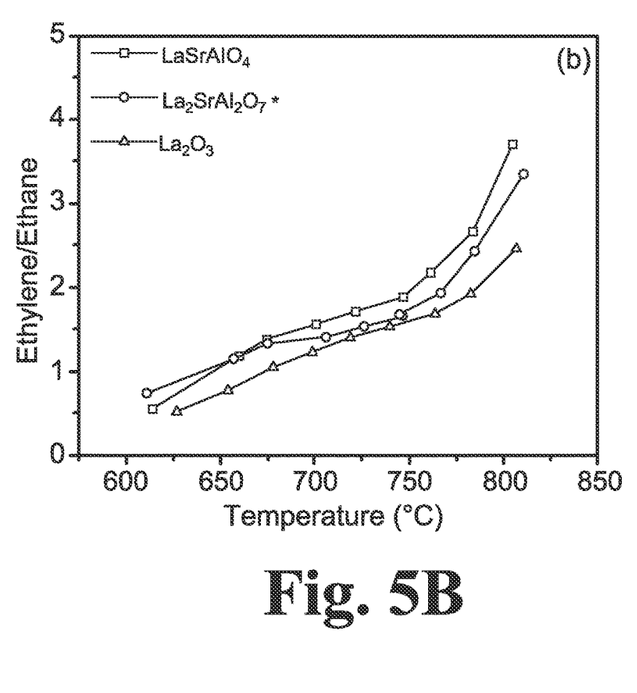
FIG. 5B is a graphical illustration of Ethylene/Ethane ratio as a function of temperature for several different LA-SR—Al oxide compositions for the reactor of FIG. 1A.

$La_2O_3$ was prepared at $\phi$=2 and tested over the temperature range from 450 to 850° C. FIG. 5a presents the $C_2$ yield with temperature for this catalyst. Similar to Sr—Al oxides, the $C_2$ yield increased and then decreased with temperature, while the ethylene/ethane ratio increased with temperature, as seen in FIGS. 5A and 5B. The maximum $C_2$ yield ~13.5% was measured at ~740° C., along with ethylene/ethane ratio ~1.5, which are among the highest values reported in the literature.

Figure 6:
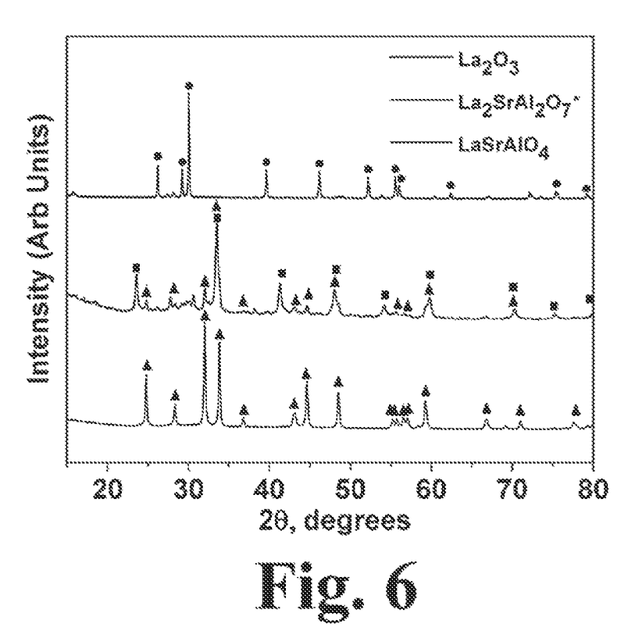
FIG. 6 graphs the XRD patterns for several different LA-SR—Al oxide compositions

As compared to the Sr—Al catalyst series, the $La_2O_3$ catalyst provides higher $C_2$ yields. In addition, this catalyst shows higher $C_2$ yield even at lower temperatures. For example, at ~700° C., $C_2$ yield for the Sr—Al catalysts is negligible, while a $C_2$ yield of ~12% is obtained for $La_2O_3$. FIG. 6 shows the XRD pattern for this catalyst, indicating formation of the hexagonal $La_2O_3$ phase, shown by (•) symbols.

La—Sr—Al Catalyst Series

Both the Sr—Al and the $La_2O_3$ catalysts as prepared above demonstrated good OCM performance. Catalysts containing Sr, Al and La were next synthesized using the SCS method and the OCM catalytic effectiveness was measured for two different La—Sr—Al catalyst compositions, $LaSrAlO_4$ and La—Sr—Al with metal ratios corresponding to $La_2SrAl_2O_7$ (henceforth referred to as $La_2SrAl_2O_7$*). These particular oxides have not been tested for OCM in the prior art.

The $C_2$ yields with temperature are presented in FIG. 5A, where a similar pattern to the previously discussed catalyst series (Sr—Al and La) was observed. The $C_2$ yield increased with increasing temperature up to ~720° C. and then decreased. For the $LaSrAlO_4$ and $La_2SrAl_2O_7$* catalysts, the maximum $C_2$ yields were ~13.0% and ~12.3%, along with the corresponding ethylene/ethane ratios 1.7 and 1.6 respectively. This series showed higher maximum $C_2$ yield at lower temperature than the Sr—Al catalysts series, indicating that addition of La to Sr and Al is beneficial. As compared to $La_2O_3$, however, no significant improvement in maximum $C_2$ yield was observed. FIG. 5B shows the effect of temperature on ethylene/ethane ratio for the La—Sr—Al catalysts. Similar patterns and ethylene/ethane ratio values observed for other catalysts were also obtained for the La—Sr—Al catalysts.

The XRD patterns of $LaSrAlO_4$ and $La_2SrAl_2O_7$* catalysts are shown in FIG. 6. While $LaSrAlO_4$ is formed in pure phase (denoted by ▲ symbol), $La_2SrAl_2O_7$* is a mixture of $LaSrAlO_4$ and $LaAlO_3$ phases (denoted by ■ symbol).

$Na_2WO_4$—$Mn/SiO_2$

In the past, $Na_2WO_4$—$Mn/SiO_2$ for OCM has been synthesized primarily by the incipient wetness impregnation method, which results in enrichment of active components on the catalyst surface. However, this also leads to their loss with time on-stream. In contrast, SCS yields a final product that is expected to be homogeneous with the same concentrations of active species on the surface and in the bulk, and is thus expected to avoid deactivation of catalyst.

Figure 7A:
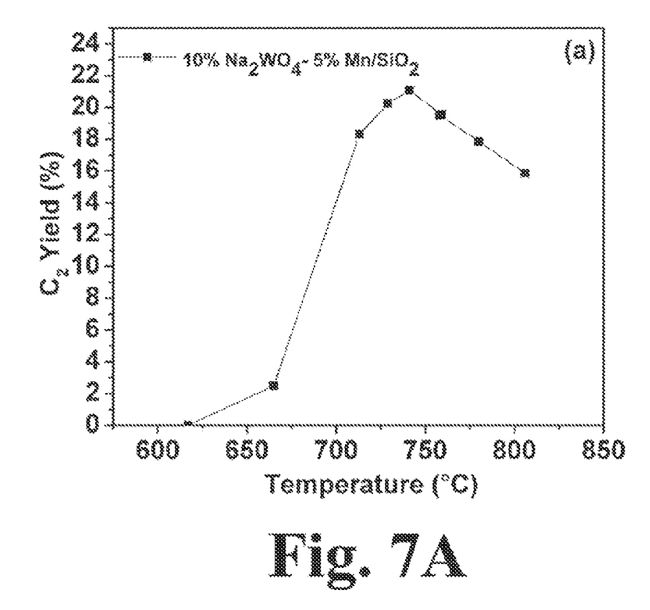
FIG. 7A is a graphical illustration of $C_2$ yield as a function of temperature for 10% $Na_2WO_4$-5% $Mn/SiO_2$ for the reactor of FIG. 1A.
Figure 7B:
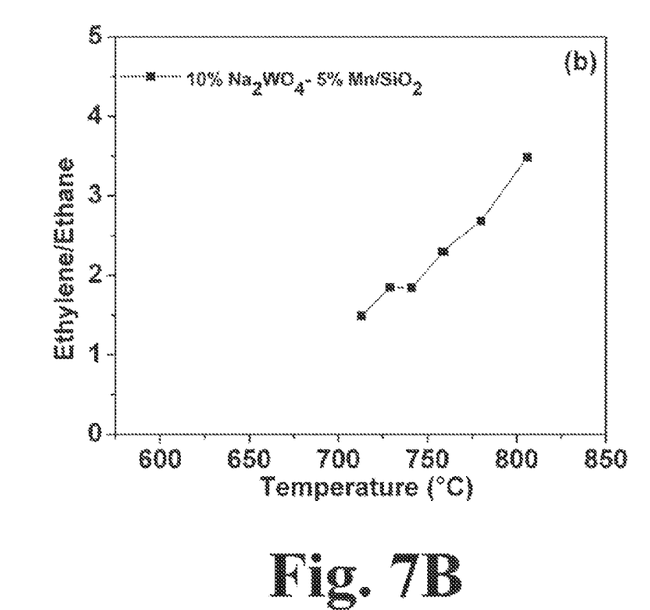
FIG. 7B is a graphical illustration of Ethylene/Ethane ratio as a function of temperature for 10% $Na_2WO_4$-5% $Mn/SiO_2$ for the reactor of FIG. 1A.
Figure 8:
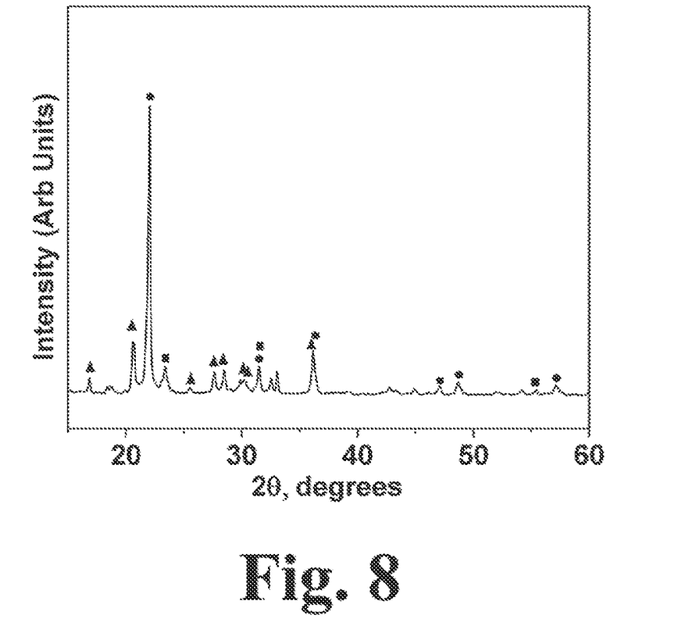
FIG. 8 graphs XRD patterns for 10% $Na_2WO_4$-5% $Mn/SiO_2$.

For the 10% $Na_2WO_4$-5% $Mn/SiO_2$SCS catalyst, the effect of temperature on $C_2$ yield and ethylene/ethane ratio is shown in FIG. 7. It may be seen that the $Na_2WO_4$—$Mn/SiO_2$ catalyst is highly active and selective, providing maximum $C_2$ yield ~21% and ethylene/ethane ratio of ~2 at ~750° C. under the standard operating conditions. FIG. 8 shows the XRD pattern of the $Na_2WO_4$—$Mn/SiO_2$ catalyst. The primary phases were $Mn_2O_3$, $Na_2WO_4$ and α-cristobalite structured $SiO_2$. This catalyst was tested for 48 hours, and showed no deactivation within the error of measurement during this period.

Figure 9:
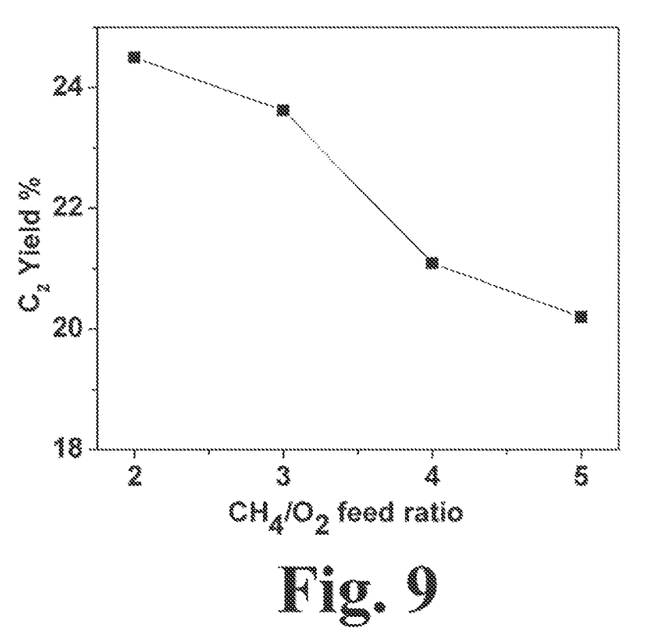
FIG. 9 graphs $C_2$ yield as a function of $CH_4/O_2$ feed ratio for OCM reactions using $Na_2WO_4$—$Mn/SiO_2$ catalyst.

To examine the performance of $Na_2WO_4$—$Mn/SiO_2$ catalyst further, the effect of $CH_4/O_2$ feed ratio was also investigated at 750° C., where the maximum yield was observed under the standard conditions. The $CH_4/O_2$ feed ratio was varied from 2 to 5, by changing the oxygen flow rate at constant methane and nitrogen flow rates of 32 cc/min and 10 cc/min, respectively. As shown in FIG. 9, the $C_2$ yield increased from ~20% to ~23.6% with decreasing $CH_4/O_2$ ratio from 5 to 3, following a slight increase to 24.5% as the $CH_4/O_2$ ratio was decreased further from 3 to 2. The $CH_4/O_2$ feed ratios below 2 were not examined because of flammability considerations. The ethylene/ethane ratio remained near 2 for the entire range of $CH_4/O_2$ ratios studied. The maximum $C_2$ yield of ~25% obtained for 10% $Na_2WO_4$-5% $Mn/SiO_2$SCS catalyst is among the highest observed for any OCM catalyst.

Comparison of Different SCS Catalysts

Figure 10:
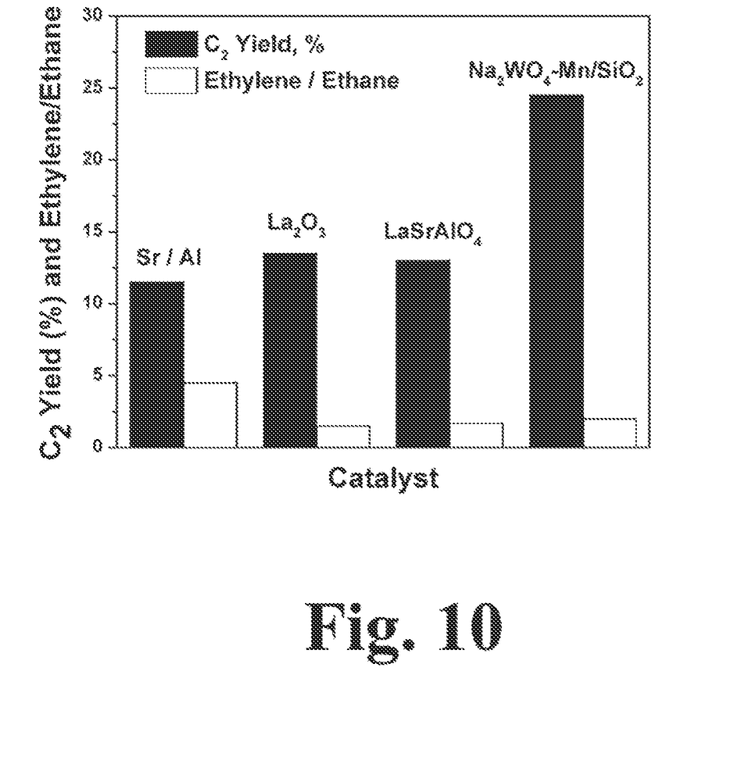
FIG. 10 graphically illustrates various SCS oxide catalysts in terms of $C_2$ yield and ethylene/ethane ratio.

FIG. 10 provides a comparison of the performance for the optimum catalysts of each series. As shown in FIG. 10, the $Na_2WO_4$—$Mn/SiO_2$ was found to be most promising among the catalysts tested in terms of $C_2$ yield. Although the maximum $C_2$ yield of the Sr—Al series is lower than all other catalysts, it shows the highest ethylene/ethane ratio of 4.5 at maximum $C_2$ yield.

The solution combustion synthesis method may be used to prepare different catalysts for OCM. This preparation technique allows for easy variation of metal ratios in the catalyst and facilitates fabrication of catalyst materials having particular desired compositions. The measurement of catalyst activity at varying Sr to Al ratios suggests that the double perovskite phase in the Sr—Al oxides is active for OCM. The $La_2O_3$ catalyst as synthesized has exhibited among the highest recorded $C_2$ yields. The addition of La to Sr and Al has increased the $C_2$ yields significantly, as seen in the La—Sr—Al series as compared to the Sr—Al series. Further, all the La-containing SCS catalysts exhibited relatively high $C_2$ yields, even at temperatures <750° C. The $Na_2WO_4$—$Mn/SiO_2$ catalyst has demonstrated very great catalytic activity for OCM. A maximum $C_2$ yield ~25% was obtained at 750° C., with feed $CH_4/O_2$=2 and the ethylene/ethane ratio at this condition was ~2.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. A method for producing metal oxide catalysts for oxidative coupling of methane reactions, comprising:
   measuring predetermined stoichiometric amounts of metal cation contributors to define a predetermined metal cation precursor;
   measuring a predetermined amount of reducing fuel;
   mixing the predetermined amount of fuel, the predetermined metal cation precursor and water to define an aqueous solution;
   evaporating water from the aqueous solution to define a concentrated solution;
   igniting the concentrated solution;
   combustively reacting the metal cation precursor with the fuel to yield a metal oxide;
   flowing methane from a first source over the metal oxide;
   flowing oxygen from a second source over the metal oxide;
   mixing methane from the first source with oxygen from the second source in the presence of the metal oxide; and
   catalyzing an oxidative coupling of methane reaction with the metal oxide;
   wherein the methane from the first source and the oxygen from the second source are kept separate until they are introduced and mixed together in the presence of the metal oxide;
   wherein the metal cation precursor is selected from the group consisting of strontium nitrate, aluminum nitrate nonahydrate, sodium tungsten oxide dihydrate, manganese nitrate tetrahydrate, tetraethoxysilane, and combinations thereof, and wherein the reducing fuel is selected from the group consisting of glycine, hydrazine, oxalates, and combinations thereof.

2. A method for making a metal oxide material, comprising:
   mixing a metal cation-containing oxidizer portion and a reducing fuel portion with water to define an aqueous solution;
   evaporatively removing water from the aqueous solution to yield a concentrated liquid;
   burning the concentrated liquid to yield an homogeneous metal oxide powder;
   mixing unblended methane and oxygen in the presence of the homogeneous metal oxide powder; and
   catalyzing an oxidative coupling of methane reaction with the homogeneous metal oxide powder;
   wherein the homogeneous metal oxide powder contains at least one metal oxide selected from the group consisting of $LaSrAlO_4$, $LaAlO_3$, $Sr_3Al_2O_6$, $Na_2WO_4$—$Mn/SiO_2$, and combinations thereof.

3. The method of claim 2 wherein metal cation containing portion is selected from the group consisting of lanthanum nitrate hexahydrate, strontium nitrate, aluminum nitrate nonahydrate, sodium tungsten oxide dihydrate, manganese nitrate tetrahydrate, tetraethoxysilane, and combinations thereof, and wherein the fuel portion is selected from the group including glycine, hydrazine, oxalates, and combinations thereof.

4. The method of claim 2 wherein the reducing fuel portion to metal-cation containing oxidizer portion ratio is between 0.5 and 2.0.

5. The method of claim 1, and further comprising:
dissolving solids into the aqueous solution;
evaporating the concentrated solution to yield a paste; and
self-igniting the paste.

6. A method for producing metal oxide catalysts for oxidative coupling of methane reactions, comprising:
measuring predetermined stoichiometric amounts of metal cation contributors to define a predetermined metal cation precursor;
measuring a predetermined amount of reducing fuel;
mixing the predetermined amount of fuel, the predetermined metal cation precursor and water to define an aqueous solution;
evaporating water from the aqueous solution to define a concentrated solution;
igniting the concentrated solution;
combustively reacting the metal cation precursor with the fuel to yield a metal oxide;
flowing methane from a first source over the metal oxide at a first flow rate;
flowing oxygen from a second source over the metal oxide at a second flow rate;
introducing and mixing methane from the first source with oxygen from the second source in the presence of the metal oxide; and
catalyzing an oxidative coupling of methane reaction with the metal oxide;
wherein the methane from the first source and the oxygen from the second source are kept separate until they are introduced to one another in the presence of the metal oxide;
wherein the metal cation precursor is selected from the group consisting of strontium nitrate, aluminum nitrate nonahydrate, sodium tungsten oxide dihydrate, manganese nitrate tetrahydrate, tetraethoxysilane, and combinations thereof, and wherein the reducing fuel is selected from the group consisting of glycine, hydrazine, oxalates, and combinations thereof;
wherein the first and second flow rates may be varied independently of one another.

* * * * *